(12) United States Patent
Herbold et al.

(10) Patent No.: US 8,602,390 B2
(45) Date of Patent: Dec. 10, 2013

(54) JACKING MECHANISM

(75) Inventors: John William Herbold, Fountain Inn, SC (US); Randall Stephen Corn, Travelers Rest, SC (US)

(73) Assignee: General Electric Company, Schenectady, NY (US)

( * ) Notice: Subject to any disclaimer, the term of this patent is extended or adjusted under 35 U.S.C. 154(b) by 545 days.

(21) Appl. No.: 12/956,003

(22) Filed: Nov. 30, 2010

(65) Prior Publication Data

US 2012/0132872 A1 May 31, 2012

(51) Int. Cl.
*B66F 3/00* (2006.01)

(52) U.S. Cl.
USPC .............................. 254/92; 254/100

(58) Field of Classification Search
USPC .................. 254/92, 95, 100, 103, 133 R, 134
See application file for complete search history.

(56) References Cited

U.S. PATENT DOCUMENTS

| | | | |
|---|---|---|---|
| 1,707,870 A | 4/1929 | Morton | |
| 1,852,521 A | 4/1932 | Hill | |
| 2,393,795 A | 1/1946 | Miller | |
| 2,654,569 A | 10/1953 | Cooper | |
| 3,711,920 A | 1/1973 | Simmons, Jr. | |
| 3,997,957 A | 12/1976 | Tone et al. | |
| 4,015,324 A | 4/1977 | Lutter | |
| 4,027,373 A | 6/1977 | Kwast et al. | |
| 4,540,199 A | 9/1985 | Neill | |
| 4,671,324 A | 6/1987 | Neill | |
| 5,664,762 A * | 9/1997 | Rothbauer | 254/103 |
| 6,685,169 B2 * | 2/2004 | Shim | 254/103 |
| 6,988,712 B2 * | 1/2006 | Kawasaki et al. | 254/103 |
| 2003/0015693 A1 * | 1/2003 | Kawasaki | 254/103 |
| 2012/0132872 A1 * | 5/2012 | Herbold et al. | 254/92 |

FOREIGN PATENT DOCUMENTS

EP 0157455 10/1985
WO WO2004082887 A1 9/2004

OTHER PUBLICATIONS

European Patent Office Extended Search Report; Application 11190152.6; General Electric Company; Mailed Mar. 2, 2012; 5 pages.

* cited by examiner

*Primary Examiner* — Lee D Wilson
(74) *Attorney, Agent, or Firm* — Cantor Colburn LLP

(57) ABSTRACT

A jacking mechanism for industrial equipment includes an insert securable in a casing hole of a first casing half of an item of industrial equipment and a jacking bolt insertable in the insert. The jacking bolt includes a jacking bolt thread meshable with an insert thread and a bearing tip secured to the jacking bolt. Advancing the jacking bolt through the insert brings the bearing tip into contact with a second casing half thus moving the first casing half relative to the second casing half. A jacking system for industrial equipment includes a plurality of jacking mechanisms configured to evenly change a gap between the first casing half and the second casing half.

17 Claims, 2 Drawing Sheets

JACKING MECHANISM

BACKGROUND OF THE INVENTION

The subject matter disclosed herein relates to industrial equipment such as turbomachines, gas turbines, steam turbines, generators, axial compressors, centrifugal compressors, reciprocating compressors, industrial motors, and other industrial equipment that require the removal of components via the use of a jacking bolt feature.

A typical piece of industrial equipment, for example, a turbomachine, has a number of casings, including inlet or fan casings, compressor casings, combustion casings, turbine casings, and an exhaust case. The casings typically are segmented around a circumference of the turbomachine, with a common configuration being that the casings have an upper half and a lower half. During service of the turbomachine, it is often necessary to remove a segment of a particular the casing, for example, a top half, to access the components of the turbomachine. A number of jacking bolts around the casing are utilized. Each jacking bolt, typically one at each corner of the casing, is threaded into a threaded hole in the upper casing half. As the jacking bolt is advanced through the threaded hole, the end of the jacking bolt presses on the lower casing half to push the casing halves apart. The jacking operation often results in galling and seizing of the jacking bolt inside the threaded hole and very high input torque from the operator is required. Further, to lift the casing half without damaging adjacent casings or components in the interior of the turbomachine requires simultaneous advancing of the jacking bolts to insure level lifting of the casing half. This operation is performed manually with an operator at each jacking bolt and is time consuming and expensive.

BRIEF DESCRIPTION OF THE INVENTION

According to one aspect of the invention, a jacking mechanism for industrial equipment includes an insert securable in a casing hole of a first casing half of an item of industrial equipment and a jacking bolt insertable in the insert. The jacking bolt includes a jacking bolt thread meshable with an insert thread and a bearing tip secured to the jacking bolt. Advancing the jacking bolt through the insert brings the bearing tip into contact with a second casing half thus moving the first casing half relative to the second casing half.

According to another aspect of the invention, a jacking system for industrial equipment casings includes a plurality of jacking mechanisms disposed at a first casing half of an item of industrial equipment configured to evenly change a gap between the first casing half and a second casing half. Each jacking mechanism includes an insert securable in a casing hole of the first casing half and a jacking bolt insertable in the insert. The jacking bolt includes a jacking bolt thread meshable with an insert thread and a bearing tip secured to the jacking bolt. Advancing the jacking bolt through the insert brings the bearing tip into contact with the second casing half thus moving the first casing half relative to the second casing half.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
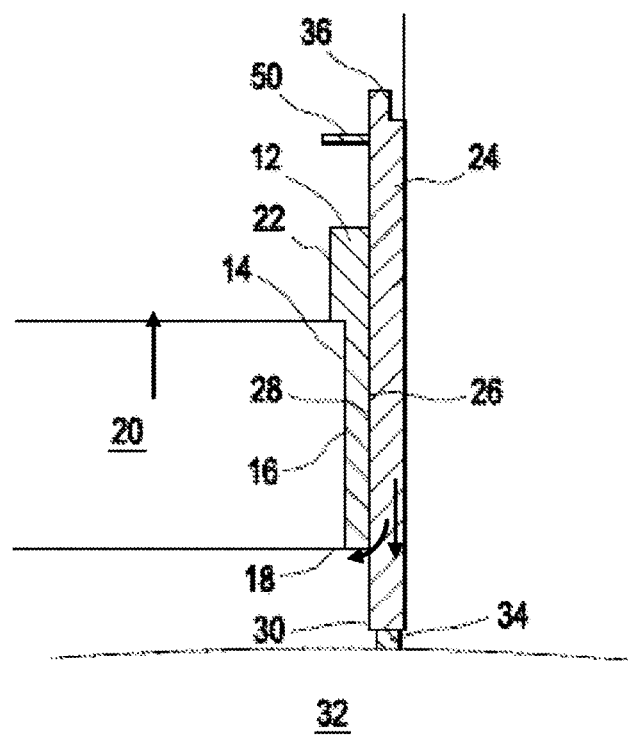
FIG. 1 is a cross-sectional view of an embodiment of a jacking mechanism for an item of industrial equipment.

Shown in FIG. 1 is cross-sectional view of an embodiment of a jacking mechanism 10 for an item of industrial equipment, for example a turbomachine, gas turbine, steam turbine, generator, axial compressor, centrifugal compressor, reciprocating compressor, industrial motor, or the like. The jacking mechanism 10 includes a tubular insert 12 having outer threads 14 complimentary to casing threads 16 of a casing hole 18 in an upper casing half 20. The casing threads 16 and the outer threads 14 may be of any suitable profile, for example UN-type threads. In some embodiments, the insert 12 has a hex-shaped head 22 for installation into the upper casing half 20. In some embodiments, the insert 12 is made from a strong bearing material which is resistant to galling, such as phosphor bronze.

A jacking bolt 24 is insertable into the insert 12 and has a bolt thread 26 that engages an inner thread 28 of the insert 12. The bolt thread 26 has a thread profile which is able to withstand the high loads of the jacking process, such as an ACME thread, which is known to those skilled in the art. Alternatively, the thread profile of the bolt thread 26 may be buttress, square, or other appropriate thread profile. In some embodiments, the bolt thread 26 is coated with, for example, a dry film lubricant, to reduce running torque of the thread and reduce galling. As the jacking bolt 24 is advanced through the insert 12 via the bolt thread 26, a bolt tip 30 of the jacking bolt 24 reacts off of a lower casing half 32 thereby lifting the upper casing half 20 from the lower casing half 32.

In some embodiments, the jacking bolt 24 includes a bearing tip 34. The bearing tip 34 may be a piece of bronze or other bearing material secured to the bolt tip 30 which is a contact surface for the jacking bolt 24 at the lower casing half 32. In other embodiments, the bearing tip 34 may be a ball bearing, needle bearing, or the like secured to the bolt tip 30. The bearing tip 34 reduces input torque necessary from the user to lift the upper casing half 20 compared to the prior art jacking bolts. A head 36 of the jacking bolt 24 may be configured with a drive feature, such as a hex drive pattern, a square drive pattern, opposing flats, either male or female, to facilitate advancing of the jacking bolt 24 through the insert 12.

To lift the upper casing half 20 from the lower casing half 32, a plurality of jacking bolts 24 are utilized. In some embodiments, one jacking bolt 24 is located near each corner of the upper casing half 20. When lifting the upper casing half 20, it is desired to lift the upper casing half 20 evenly at each jacking bolt 24 to prevent interference with adjacent casings or damage to components of the industrial equipment. In some embodiments, provisions may be provided to assist in keeping the upper casing half 20 level when lifting it from the lower casing half 32. For example, each jacking bolt 24 may be fitted with a dial 50 which counts revolutions of the jacking bolt 24. Because the jacking bolt 24 has a constant thread-pitch, an equal number of revolutions of the various jacking bolts 24, will maintain the upper casing half 20 level through the lifting operation. A similar result could be achieved with spring loaded measuring sticks located at each corner of the upper casing half 20, or by using chromatic light, lasers, or the like to measure an opening distance between the upper casing half 20 and the lower casing half 32.

Figure 2:
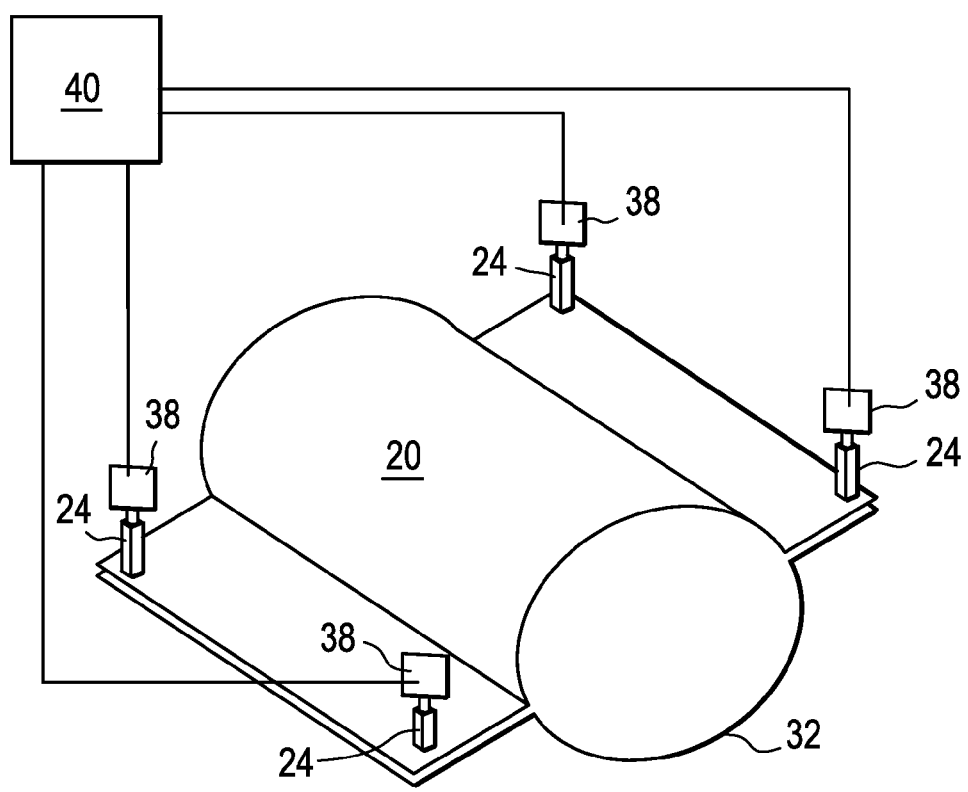
FIG. 2 is a schematic of a jacking system for an item of industrial equipment.

Alternatively, as shown in FIG. 2, each jacking bolt 24 is connected to a motor 38. The motor 38 advances the jacking bolt 24 to raise the upper casing half 20. The motors 38 may be synchronized by a controller 40 to keep the upper casing half 20 level while raising it.

In some embodiments, it is desired to reduce friction between the insert 12 and the jacking bolt 24 by reducing corrosion of those components. As such, in some embodiments, the insert 12 and the jacking bolt 24 may be formed of corrosion-resistant materials, such as a phosphor bronze for the insert 12 and a stainless steel for the jacking bolt 24.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A jacking mechanism for industrial equipment comprising:
   an insert securable in a casing hole of a first casing half of an item of industrial equipment; and
   a jacking bolt insertable in the insert, the jacking bolt including:
   a jacking bolt thread meshable with an insert thread; and
   a bearing tip secured to the jacking bolt;
   wherein, advancing the jacking bolt through the insert brings the bearing tip into contact with a second casing half thus moving the first casing half relative to the second casing half.

2. The jacking mechanism of claim 1, wherein the bearing tip is one of a ball bearing or a needle bearing.

3. The jacking mechanism of claim 1, wherein the insert includes an outer thread meshable with a casing thread disposed in the casing hole.

4. The jacking mechanism of claim 1, wherein the jacking bolt thread has an ACME thread profile.

5. The jacking mechanism of claim 1, wherein the jacking bolt includes a head with a drive feature.

6. The jacking mechanism of claim 5, wherein the drive feature is a hex or square drive pattern.

7. The jacking mechanism of claim 1, including a counter secured to the jacking bolt to count revolutions of the jacking bolt in the insert.

8. A jacking system for industrial equipment casings comprising:
   a plurality of jacking mechanisms disposed at a first casing half of an item of industrial equipment, the jacking mechanisms configured to evenly change a gap between the first casing half and a second casing half including:
   an insert securable in a casing hole of the first casing half; and
   a jacking bolt insertable in the insert, the jacking bolt including:
   a jacking bolt thread meshable with an insert thread; and
   a bearing tip secured to the jacking bolt;
   wherein, advancing the jacking bolt through the insert brings the bearing tip into contact with the second casing half thus moving the first casing half relative to the second casing half.

9. The jacking system of claim 8, wherein the plurality of jacking mechanisms are operably connected to a controller to synchronize advancement of each jacking bolt through each insert.

10. The jacking system of claim 8, wherein each jacking bolt is operably connected to a motor to drive advancement of the jacking bolt through the insert.

11. The jacking system of claim 8, wherein a jacking mechanism is disposed near each corner of the first casing half.

12. The jacking system of claim 8, wherein the bearing tip is one of a ball bearing or a needle bearing.

13. The jacking system of claim 8, wherein the insert includes an outer thread meshable with a casing thread disposed in the casing hole.

14. The jacking system of claim 8, wherein the jacking bolt thread has an ACME thread profile.

15. The jacking system of claim 8, wherein the jacking bolt includes a head with a drive feature.

16. The jacking system of claim 15, wherein the drive feature is a hex or square drive pattern.

17. The jacking system of claim 8, including a counter secured to the jacking bolt to count revolutions of the jacking bolt in the insert.

* * * * *